(12) United States Patent
Wassom et al.

(10) Patent No.: US 8,407,601 B2
(45) Date of Patent: *Mar. 26, 2013

(54) CUSTOMIZED USER INTERFACE

(75) Inventors: Jack Wassom, Rathcoole (IE); Renee Schaefer, Tucson, AZ (US); Cory Chandler, Fairfax, VA (US)

(73) Assignee: Facebook, Inc., Menlo Park, CA (US)

( * ) Notice: Subject to any disclaimer, the term of this patent is extended or adjusted under 35 U.S.C. 154(b) by 635 days.

This patent is subject to a terminal disclaimer.

(21) Appl. No.: 12/493,682

(22) Filed: Jun. 29, 2009
(Under 37 CFR 1.47)

(65) Prior Publication Data

US 2010/0031161 A1 Feb. 4, 2010

Related U.S. Application Data

(63) Continuation of application No. 09/224,211, filed on Dec. 30, 1998, now Pat. No. 7,555,721.

(51) Int. Cl.
G06F 3/00 (2006.01)
(52) U.S. Cl. ......... 715/741; 715/743; 715/744; 715/811
(58) Field of Classification Search .................. 715/747, 715/811, 741–745, 810
See application file for complete search history.

(56) References Cited

U.S. PATENT DOCUMENTS

| | | |
|---|---|---|
| 4,706,121 A | 11/1987 | Young |
| 5,115,501 A | 5/1992 | Kerr |
| 5,253,066 A | 10/1993 | Vogel |
| 5,341,293 A | 8/1994 | Vertelney et al. |
| 5,347,628 A | 9/1994 | Brewer et al. |
| 5,442,788 A | 8/1995 | Bier |
| 5,479,268 A | 12/1995 | Young et al. |
| 5,533,184 A | 7/1996 | Malcolm |
| 5,551,037 A | 8/1996 | Fowler et al. |
| 5,553,233 A | 9/1996 | Ikeda |
| 5,596,702 A | 1/1997 | Stucka et al. |
| 5,600,776 A | 2/1997 | Johnson et al. |
| 5,625,783 A | 4/1997 | Ezekiel et al. |
| 5,664,739 A | 9/1997 | Black et al. |
| 5,678,041 A | 10/1997 | Baker et al. |
| 5,696,898 A | 12/1997 | Baker et al. |
| 5,745,109 A | 4/1998 | Nakano et al. |
| 5,761,662 A | 6/1998 | Dasan |
| 5,764,906 A | 6/1998 | Edelstein et al. |
| 5,796,393 A | 8/1998 | McNaughton et al. |
| 5,809,204 A | 9/1998 | Young et al. |
| 5,818,446 A | 10/1998 | Bertram et al. |
| 5,835,087 A | 11/1998 | Herz et al. |
| 5,880,730 A | 3/1999 | Durand |
| 5,881,225 A | 3/1999 | Worth |
| 5,907,831 A | 5/1999 | Lotvin et al. |
| 5,914,714 A | 6/1999 | Brown |

(Continued)

FOREIGN PATENT DOCUMENTS

WO 97/34388 9/1997

OTHER PUBLICATIONS

International Search Report (5 pages).

(Continued)

*Primary Examiner* — Ba Huynh
(74) *Attorney, Agent, or Firm* — Workman Nydegger (57) ABSTRACT

Regulating user interface controls includes identifying a grouping from among different groupings and providing a set of user interface controls corresponding to the identified grouping. The groupings can correspond to the maturity levels (e.g., kids and teenagers) of different network service provider users.

44 Claims, 10 Drawing Sheets

U.S. PATENT DOCUMENTS

| | | | |
|---|---|---|---|
| 5,917,491 | A | 6/1999 | Bauersfeld |
| 5,937,163 | A | 8/1999 | Lee et al. |
| 5,956,029 | A | 9/1999 | Okada et al. |
| 5,959,630 | A | 9/1999 | Takeuchi et al. |
| 5,966,533 | A | 10/1999 | Moody |
| 5,978,799 | A | 11/1999 | Hirsch |
| 5,983,270 | A * | 11/1999 | Abraham et al. ............ 709/224 |
| 5,987,611 | A | 11/1999 | Freund |
| 5,991,807 | A | 11/1999 | Schmidt |
| 6,005,566 | A | 12/1999 | Jones et al. |
| 6,009,410 | A | 12/1999 | LeMole et al. |
| 6,012,090 | A | 1/2000 | Chung et al. |
| 6,014,638 | A | 1/2000 | Burge et al. |
| 6,037,934 | A | 3/2000 | Himmel et al. |
| 6,057,836 | A | 5/2000 | Kavalam et al. |
| 6,065,047 | A | 5/2000 | Carpenter et al. |
| 6,069,628 | A | 5/2000 | Farry et al. |
| 6,072,486 | A | 6/2000 | Sheldon et al. |
| 6,075,528 | A | 6/2000 | Curtis |
| 6,091,411 | A | 7/2000 | Straub et al. |
| 6,097,389 | A | 8/2000 | Morris et al. |
| 6,104,334 | A | 8/2000 | Allport |
| 6,121,968 | A | 9/2000 | Arcuri et al. |
| 6,128,663 | A | 10/2000 | Thomas |
| 6,133,915 | A | 10/2000 | Arcuri et al. |
| 6,141,010 | A | 10/2000 | Hoyle |
| 6,161,139 | A | 12/2000 | Win et al. |
| 6,173,269 | B1 | 1/2001 | Solokl et al. |
| 6,184,886 | B1 | 2/2001 | Bates et al. |
| 6,188,401 | B1 | 2/2001 | Peyer |
| 6,208,995 | B1 | 3/2001 | Himmel et al. |
| 6,211,871 | B1 | 4/2001 | Himmel et al. |
| 6,212,522 | B1 | 4/2001 | Himmel et al. |
| 6,232,972 | B1 | 5/2001 | Arcuri et al. |
| 6,252,591 | B1 | 6/2001 | Dockweiler et al. |
| 6,256,032 | B1 | 7/2001 | Hugh |
| 6,256,739 | B1 | 7/2001 | Skopp et al. |
| 6,266,001 | B1 | 7/2001 | Fang et al. |
| 6,282,548 | B1 | 8/2001 | Burner et al. |
| 6,286,001 | B1 | 9/2001 | Walker et al. |
| 6,292,827 | B1 | 9/2001 | Raz |
| 6,297,819 | B1 | 10/2001 | Furst |
| 6,396,515 | B1 | 5/2002 | Hetherington et al. |
| 6,401,094 | B1 | 6/2002 | Stemp et al. |
| 6,421,669 | B1 | 7/2002 | Gilmour et al. |
| 6,473,800 | B1 | 10/2002 | Jerger et al. |
| 6,480,852 | B1 * | 11/2002 | Himmel et al. ........................ 1/1 |
| 6,483,523 | B1 * | 11/2002 | Feng ............................ 715/745 |
| 6,484,156 | B1 | 11/2002 | Gupta |
| 6,487,557 | B1 | 11/2002 | Nagatomo |
| 6,557,015 | B1 | 4/2003 | Bates et al. |
| 6,628,314 | B1 | 9/2003 | Hoyle |
| 6,741,967 | B1 | 5/2004 | Wu et al. |
| 6,742,030 | B1 | 5/2004 | MacPhail |
| 6,785,728 | B1 * | 8/2004 | Schneider et al. ............ 709/229 |
| 6,788,315 | B1 | 9/2004 | Kekic et al. |
| 6,816,849 | B1 | 11/2004 | Halt |
| 6,832,350 | B1 | 12/2004 | Bates et al. |
| 6,934,697 | B1 | 8/2005 | Warren |
| 7,353,234 | B2 | 4/2008 | Kimball et al. |
| 2002/0059402 | A1 | 5/2002 | Belanger |
| 2002/0091697 | A1 | 7/2002 | Huang et al. |
| 2002/0095415 | A1 | 7/2002 | Walker et al. |
| 2002/0107946 | A1 | 8/2002 | Albers |
| 2002/0186255 | A1 | 12/2002 | Shafron et al. |
| 2003/0028532 | A1 | 2/2003 | Dougu et al. |
| 2004/0165007 | A1 | 8/2004 | Shafron |
| 2005/0004978 | A1 | 1/2005 | Reed et al. |
| 2006/0149833 | A1 | 7/2006 | Dan et al. |
| 2007/0121850 | A1 | 5/2007 | Klos et al. |
| 2008/0184146 | A1 | 7/2008 | Kimball et al. |

OTHER PUBLICATIONS

"Alexa 3.0 Delivers More useful and Dynamic Information with Customizable Interface", Nov. 23, 1998, http://www.alexa.com/press/press_releases/alexa_30_release.html, pp. 1-2.

"Web Surfing Gets Down to Business with Alexa 3.0", Oct. 7, 1998, http://www.alexa.com/press/press_releases/alexa_30.html, pp. 1-3.

"Ad on the Bar" Campaign Supplements Alexa's Focused Advertising Program, Dec. 10, 1997, http://www.alexa.com/press/press_releases/ad.html, pp. 1-3.

"Alexa Internet and Netscape Team to Provide Related Sites to Support Smart Browsing", http://www.alexa.com, printed Oct. 1, 1998, 1-4 pages.

Brown et al., "Using Netscape 2", Copyright 1995 by Que Corporation, p. 74.

Eric Miller, "An Introduction to the Resource Description Framework", D-Lib Magazine, May 1998, p. 1-12.

International Search Report for PCT International Application No. PCT/US99/30987. mailed Jul. 6, 2000, pgs.

U.S. Appl. No. 09/224,211, mailed Nov. 17, 2000, Office Action.
U.S. Appl. No. 09/224,211, mailed Apr. 9, 2001, Office Action.
U.S. Appl. No. 09/224,211, mailed Oct. 22, 2001, Office Action.
U.S. Appl. No. 09/224,211, mailed Apr. 2, 2002, Office Action.
U.S. Appl. No. 09/224,211, mailed Jul. 5, 2002, Office Action.
U.S. Appl. No. 09/224,211, mailed Mar. 12, 2003, Office Action.
U.S. Appl. No. 09/224,211, mailed Jul. 15, 2005, Office Action.
U.S. Appl. No. 09/224,211, mailed Jan. 5, 2006 Office Action.
U.S. Appl. No. 09/224,211, mailed Nov. 9, 2006, Office Action.
U.S. Appl. No. 09/224,211, mailed May 3, 2007, Office Action.
U.S. Appl. No. 09/224,211, mailed Jan. 23, 2008, Office Action.
U.S. Appl. No. 09/224,211, mailed Jul. 15, 2008, Office Action.
U.S. Appl. No. 09/224,211, mailed Feb. 24, 2009, Notice of Allowance.
U.S. Appl. No. 10/134,675, mailed Sep. 25, 2003, Office Action.
U.S. Appl. No. 10/134,675, mailed Apr. 9, 2004, Office Action.
U.S. Appl. No. 10/134,675, mailed Feb. 14, 2005, Office Action.
U.S. Appl. No. 10/134,675, mailed Nov. 25, 2005, Office Action.
U.S. Appl. No. 10/134,675, mailed Jul. 11, 2006, Office Action.
U.S. Appl. No. 10/134,675, mailed Jan. 4, 2007, Notice of Allowance.
U.S. Appl. No. 10/134,675, mailed Nov. 2, 2007, Notice of Allowance.
U.S. Appl. No. 12/059,157, mailed Jul. 15, 2010, Office Action.
U.S. Appl. No. 12/059,157, mailed May 5, 2011, Office Action.
U.S. Appl. No. 12/059,157, mailed Oct. 31, 2011, Office Action.

* cited by examiner

CUSTOMIZED USER INTERFACE

CROSS-REFERENCE TO RELATED APPLICATIONS

This application is a continuation application of and claims priority to U.S. application Ser. No. 09/224,211, filed on Dec. 30, 1998.

TECHNICAL FIELD

This invention relates to customized user interfaces, for example, a graphical user interface (GUI).

BACKGROUND

Figure 1:
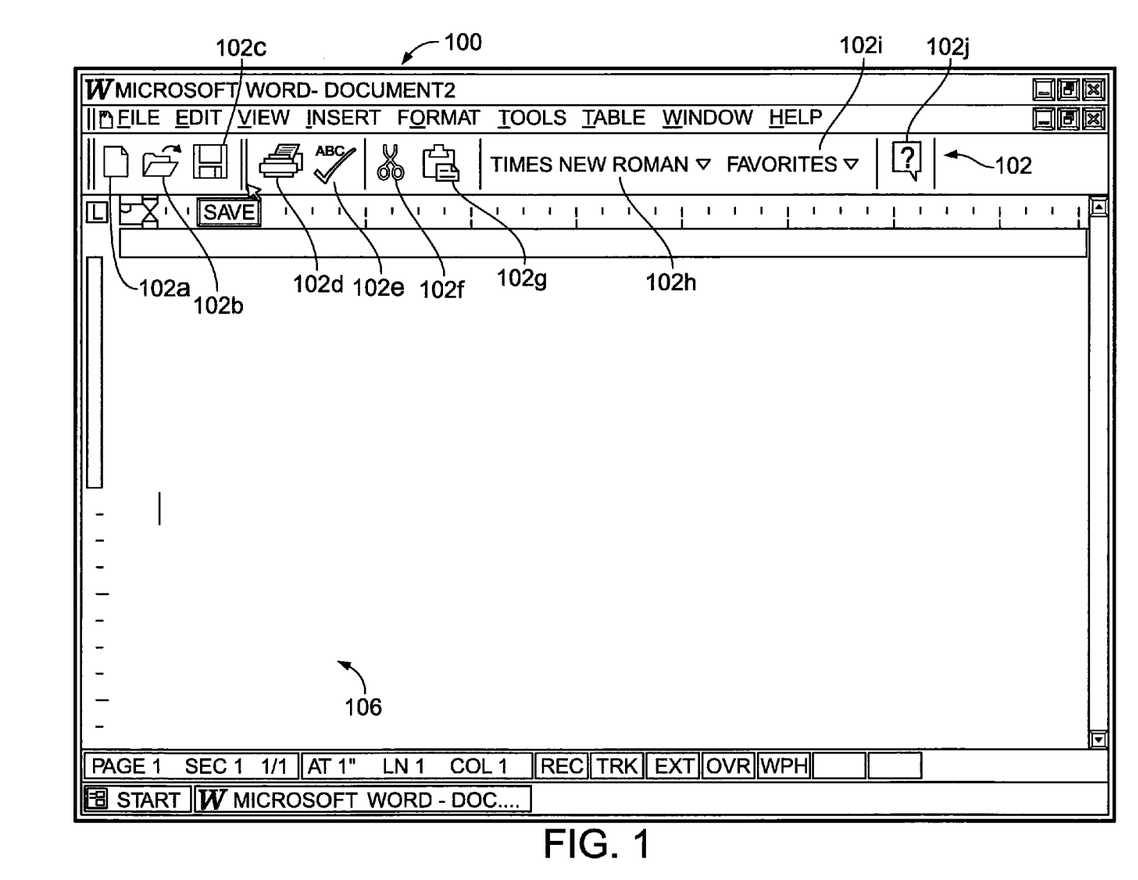
FIGS. 1-2 are screenshots of a graphical user interface (GUI).

A GUI can include a wide variety of user interface controls that respond to user manipulation. Referring to FIG. 1, a Microsoft Word™ word processing application GUI 100 includes a toolbar 102 that presents a row of user input controls 102a-102j positioned in a substantially regular pattern. The controls enable a user 102a-102j to quickly perform common tasks such as opening 102b, saving 102c, and printing 102d a document 106. By collecting controls into an easily accessible area of the GUI 100, the toolbar 102 enables a user to quickly find and access a particular control whenever the user wants the application to perform a task associated with the selected control.

The toolbar 102 can include button controls (buttons) 102a-102g, 102i that feature pictorial representations of common tasks. When activated by a user (e.g., clicked on), a button 102a-102g, 102i responds by causing a predetermined application function to occur. For example, button 102c includes a picture of a diskette. When a user clicks on the picture of a diskette 102c or anywhere within a bounding region that defines the button 102c, the word processor saves a document 106.

Figure 2:
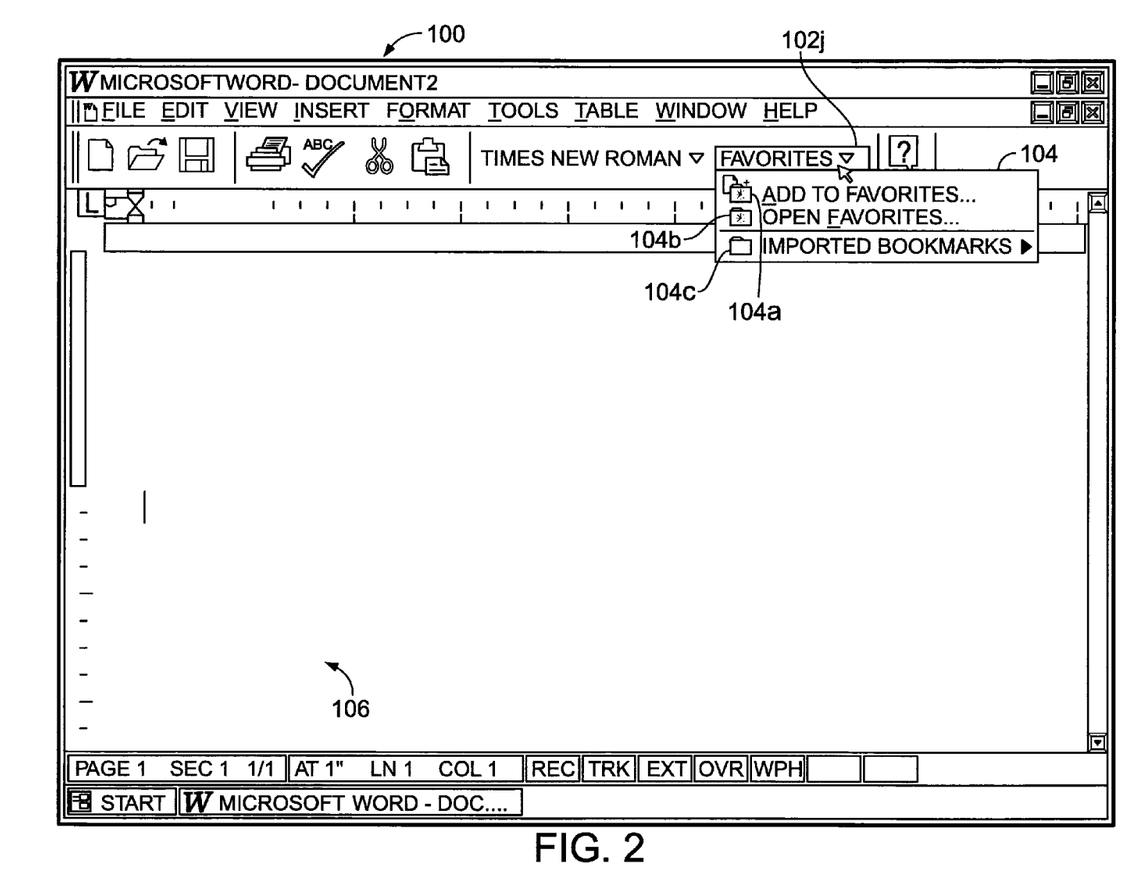

The toolbar 102 can include controls other than buttons 102a-102e, 102j. For example, as shown, the toolbar 102 includes a list control 102h and a pull-down menu control 102i. Referring also to FIG. 2, when activated by a user, the pull-down menu control 102i presents a list of menu choices 104a-104c.

A control can be responsive to user input (i.e, enabled) or unresponsive (i.e., disabled). A control can be displayed differently if disabled. For example, because the user has not selected any document text 106, the button 102f corresponding to a "cut" function is displayed in a muted gray-scale, indicating that the "cut" function is presently unavailable. As shown, although displayed differently, a disabled control (e.g., 120f) nevertheless occupies its normal amount of space on the GUI screen 100.

The toolbar 102 can remain visible while a user performs other actions such as working on the document 106. Additionally, a user can move the toolbar 102 to different regions of a screen 100. Microsoft Word™ also allows a user to tailor the controls included in a toolbar 102 based on personal preference. For example, a user who does not have a printer can remove the print button 102f from the toolbar 102.

The inventors have determined that it would be desirable to provide a customized user interface that includes different controls for users belonging to different groups.

SUMMARY

In general, in one aspect, a method of regulating user interface controls includes identifying a grouping from among a plurality of groupings and providing a set of user interface controls corresponding to the identified grouping.

Embodiments may include one or more of the following features.

The set of user interface controls may be displayed as a bank of controls. The controls can include buttons, pull-down menu controls, among other user interface controls. The user interface controls can be provided by controls changing an existing collection of user interface controls (e.g., adding or removing user interface controls in a default set of controls).

The groupings may be based on user maturity. For example, different groupings may be for children and/or teenagers. The groupings may also be used to identify access levels to network service provider services such as e-mail, chat rooms, and internet browsing.

Identifying a grouping may include receiving user information and based on the received information, determining the grouping. Such user information can be received via a network connection. The information may include a user identifier. The user identifier may be associated with a grouping by storing the associated grouping in a database. The grouping can be selected from a list or by identifying user characteristics such as a user's age.

In general, in another aspect, a method of producing a toolbar having user interface controls includes associating a grouping corresponding to a maturity level with a user identifier by receiving a selection of a grouping from a plurality of groupings, receiving a user identifier over a network connection, determining the grouping associated with the user identifier, and using the determined grouping to produce a toolbar having user interface controls. The user interface controls included in the toolbar are determined based on the grouping associated with the user identifier.

In general, in another aspect, a computer program, residing on a computer-readable medium, includes instructions for causing a computer to identify a grouping from among a plurality of groupings and provide a set of user interface controls corresponding to the identified grouping.

Advantages can include one or more of the following. By customizing the controls made available by a toolbar based on a user's group, different users can enjoy the benefits of a toolbar without the clutter of permanently disabled controls or controls not frequently accessed. When the groups correspond to different levels of maturity, an application can provide youngsters with a toolbar that limits access to certain functions, for example, by omitting buttons relating to forbidden functions, without calling these limitations to a child's attention. Additionally, a simplified toolbar—for example, a toolbar that includes buttons different than those available on a full-access toolbar—can direct a child's attention to age-appropriate features that a child likely would enjoy.

When a network service provider furnishes group specific toolbars, adults can place a child in front of a networked computer without worrying that the child will stumble onto material intended for mature audiences. At the same time, the child is not frustrated or confused by interacting with a toolbar featuring a number of disabled controls.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5A1, 5A2 and 5B are screenshots of toolbars that have different controls based on the different access-levels of different users.

Like reference numbers and designations in the various drawings indicate like elements.

DETAILED DESCRIPTION

Figure 3:
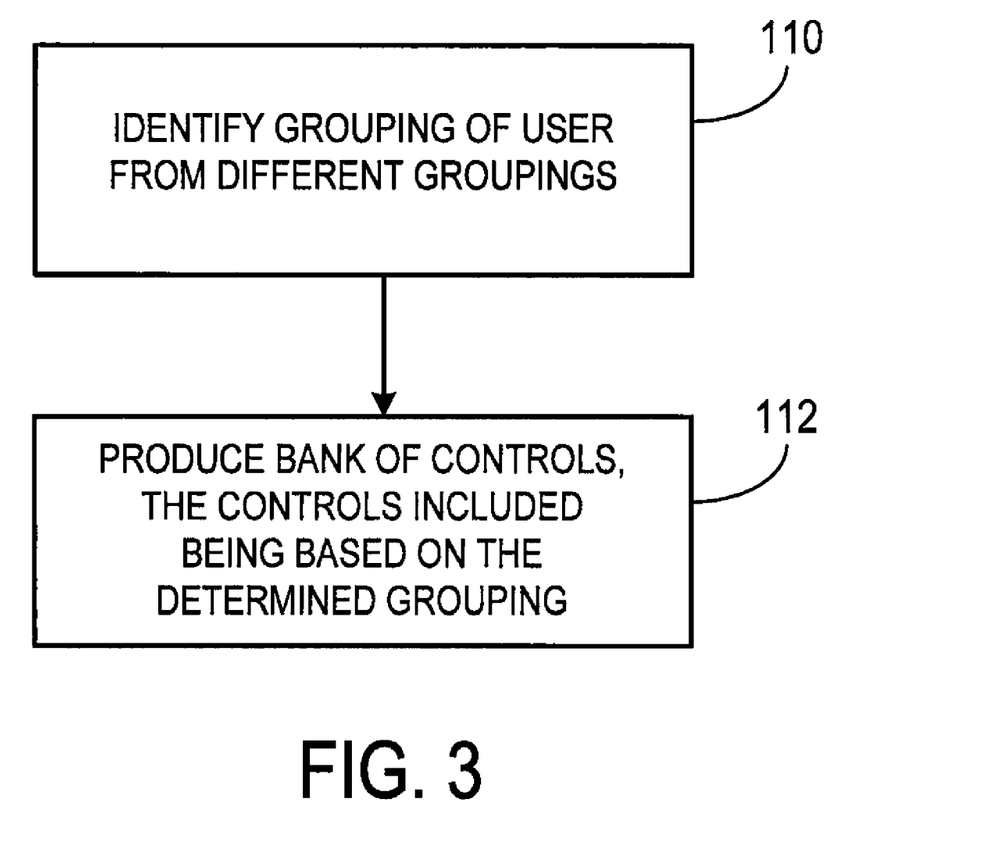
FIG. 3 is a flowchart for producing a bank of controls based on an identified access level.

Referring to FIG. 3, producing a bank of user interface controls for a graphical user interface (GUI) includes identifying a user's grouping from a set of different groupings (110) and including controls in the bank of controls based on the identified grouping (112). Identifying a grouping can be achieved based on any combination of a wide variety of factors. For example, a grouping can be determined based on information describing user characteristics (e.g., age) or by using environmental information (e.g., when an application is launched).

This technique of producing a bank of user interface controls provides a user with a concentrated collection of controls tailored to a user's grouping. Thus, users belonging to a group having restricted-access do not experience the problem of toolbar clutter that results from permanently disabled controls reserved for more privileged users. Additionally, functions that a certain class of user (e.g., kid, elderly, mentally challenged) are likely to use more frequently can be presented more conspicuously (e.g., as a toolbar button instead of as a menu choice).

The technique described above has a wide variety of potential applications. For example, network services such as e-mail and Internet access offer adults a wealth of information and communication options. These services, however, can expose teenagers and children to subject matter aimed at more mature audiences. Some inappropriate material is actively sought by young users (e.g., via the Internet) while other material is inappropriately sent to young users (e.g., in chat rooms). Accordingly, one implementation employs maturity-based groupings to customize different toolbars for network service users of different ages.

Figure 4A:
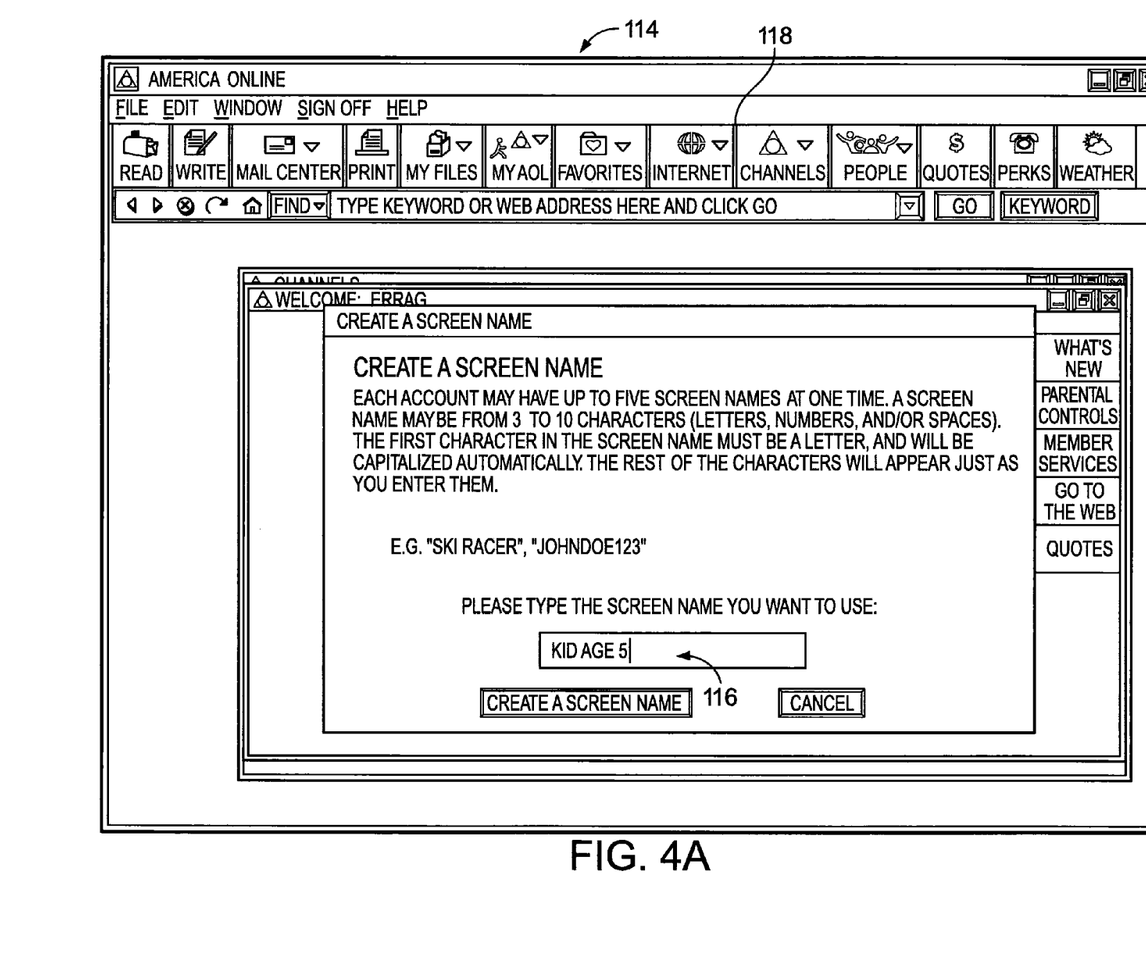
FIGS. 4A-4B are screenshots of a GUI that can define an access level for a user.

Referring to FIG. 4A, a network service provider GUI 114 can include one or more toolbars 118. Tailoring a toolbar 118 to include a specific set of controls for users of different ages can help protect teenagers and younger children from inappropriate material and simplify use by eliminating otherwise disabled functions from representation on a GUI screen 114. This tailoring also can steer younger users toward areas of potential interest.

Figure 4B:
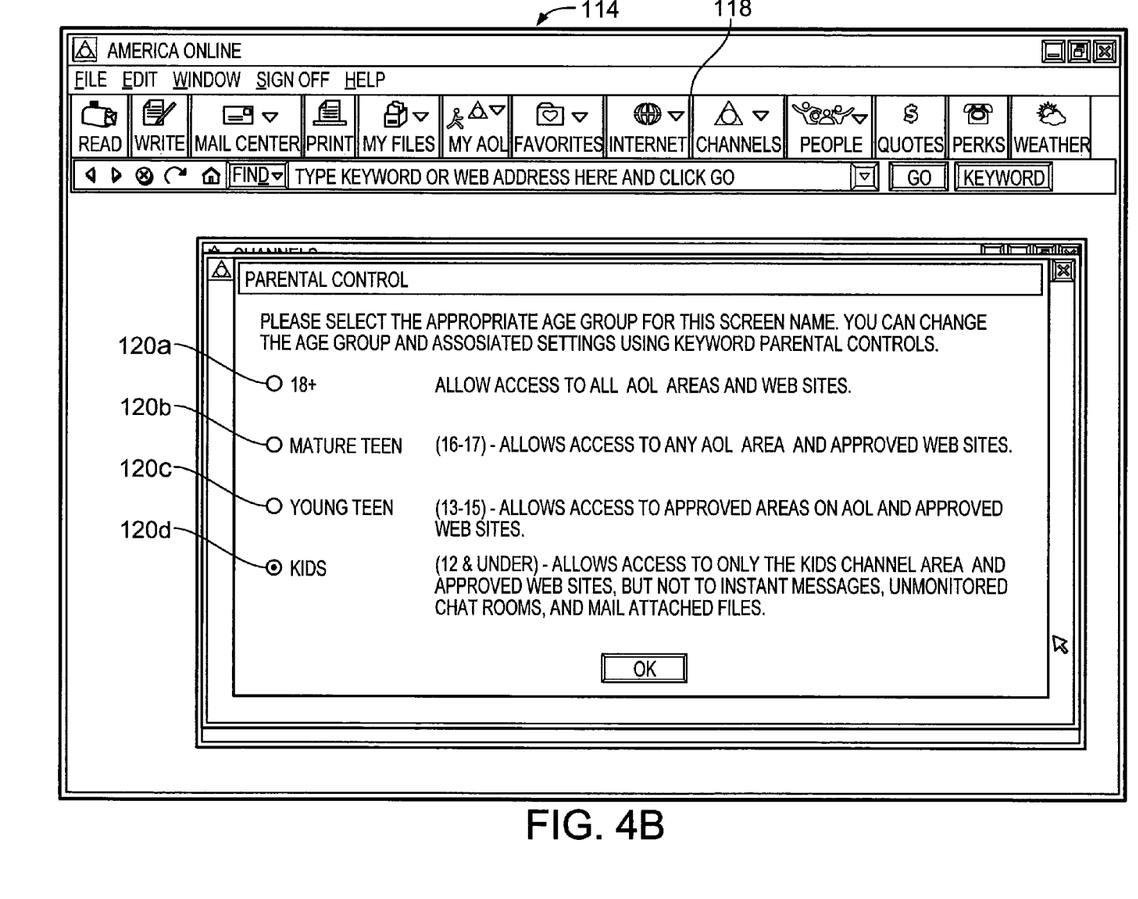

In one implementation a user's grouping is defined by a "master" user such as an adult having an account with a network service provider. As shown, an adult can create an account for a child by selecting a screen name (i.e., a user identifier) 116. Referring to FIG. 4B, the adult then can select a grouping (e.g., 18+ 120a, mature teen 120b, young teen 120c, or kids 120d) from a list of groupings to associate the selected grouping with the user identifier. Different groupings also grant different levels of access to the Internet (e.g., browsing, newsgroups, FTP (file transfer protocol) downloads), e-mail, chat sessions, and other network services (e.g., account management). Network service software on a client or a host can use a selected grouping (e.g., as defined by a master user) to provide a toolbar tailored to services available to the members of the selected grouping. Selecting a grouping from a list of groupings enables an adult to quickly set up accounts for different youngsters that both provide appropriate limitations on access and provide a customized user interface. The groupings shown are merely illustrative. In another implementation, the network service software includes only two groupings: "Internet access" and "no Internet access."

Referring to FIGS. 5A1, 5A2, and 5B, a toolbar 118 produced for a user identified as having an "18+" grouping includes controls different from a toolbar 124 produced for a user identified as belonging to a "kids" group. As shown, both toolbars 118, 124 share a number of common controls such as controls for handling e-mail 118a-118c, 124a-124c. Additionally, both toolbars 118, 124 share general characteristics. For example, buttons 118a, 118b, 118k-118m and pull-down menus 118c, 118e-118j both include pictures (e.g, a printer) and text (e.g, "Print") describing the function(s) accessible with a control. A user can reduce the amount of screen space a toolbar 118, 124 occupies by configuring the toolbar 118, 124 to only display the text description (not shown).

Figure 5A:
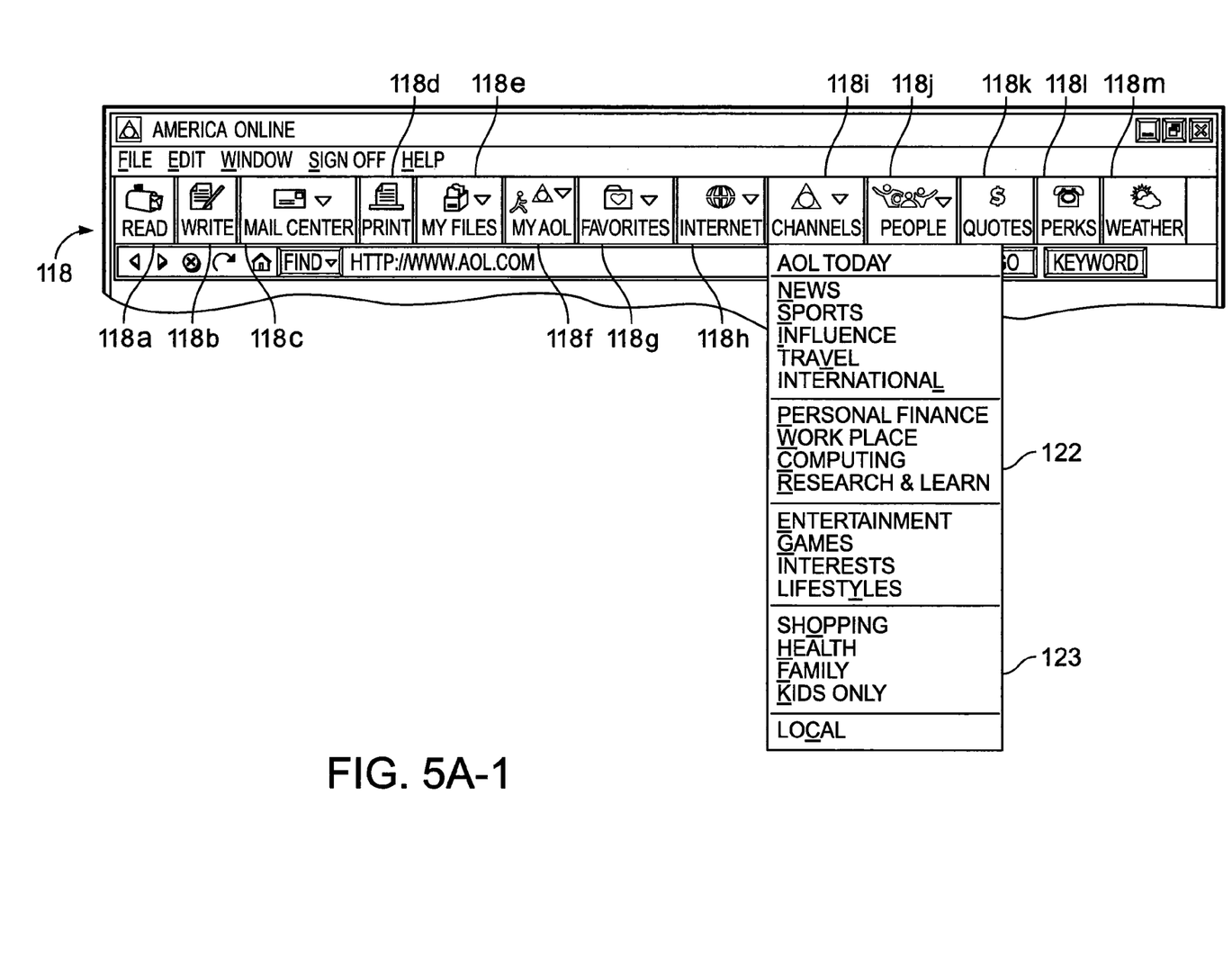
Figure 5A:
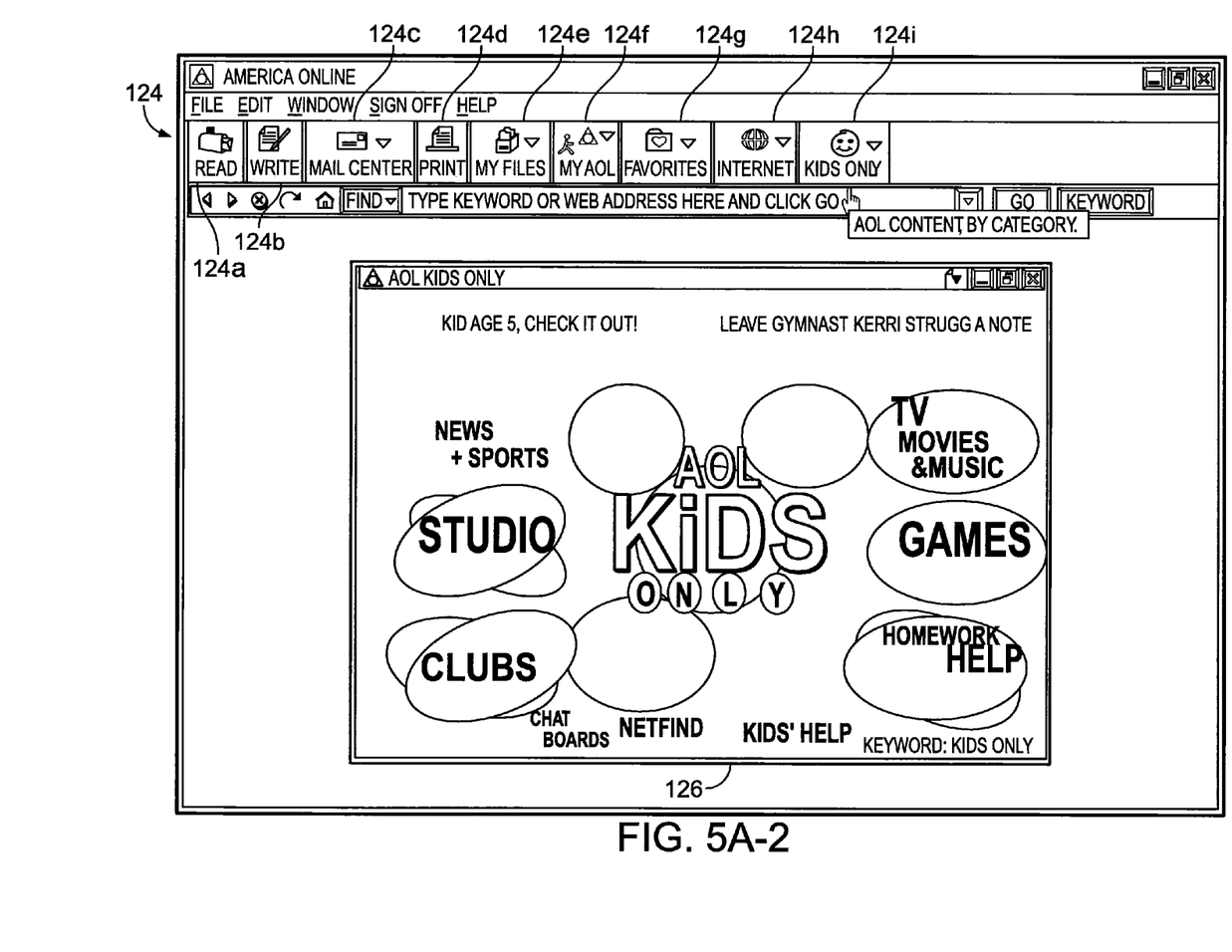

As shown in FIG. 5A, adult toolbar 118 includes a pull-down menu control 118i labeled "Channels" that lists menu choices 122 corresponding to different categories of information that a user can access. Some of the information included in these categories may be inappropriate for young children (e.g., magazine subscriptions that can be ordered using a "bill me later" option). As shown, the "Channels" pull-down menu 122 features a "Kids Only" menu choice 123 near the end of the listed choices 122.

The kids toolbar 124 does not include a number of controls 118j-118m included in the adult toolbar 118 (e.g., controls for accessing stock quote information and for making purchases). Additionally, the kids toolbar 124 does not include the "Channels" menu control 118i included in the adult toolbar 118. The kids toolbar 124 instead includes a "Kids Only" button 124i that presents a "Kids Only" window 126 when activated. Providing access to the "Kids Only" window 126 as a prominent button 124i in the kids toolbar 124, instead of being buried in a list of choices provided by a pull-down menu control 118i, increases the likelihood a young child will navigate to the window 126.

Figure 5B:
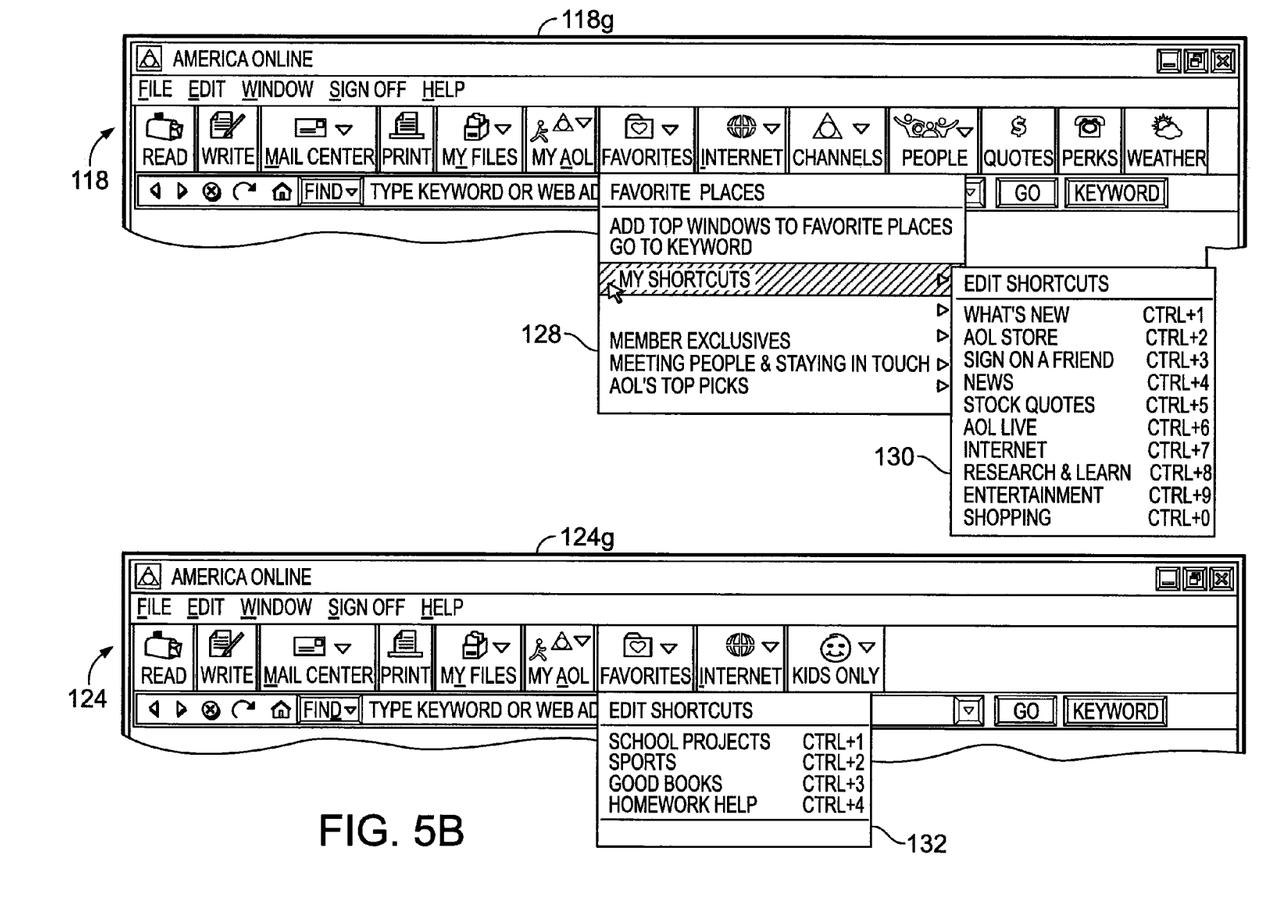

Referring to FIG. 5B, the adult toolbar 118 also includes a "Favorites" pull-down menu control 118g that contains references to content frequently accessed by an adult. Many of the listed entries, for example, merchandise available for purchase on-line or bookmarked Internet sites, may be inappropriate for children. The kid's toolbar 124 does not include the "Favorites" pull-down menu control 118g, but instead offers a "Shortcuts" pull-down menu control 124g that lists choices that direct a child to areas of special interest to kids (e.g., school project ideas).

Figure 6:
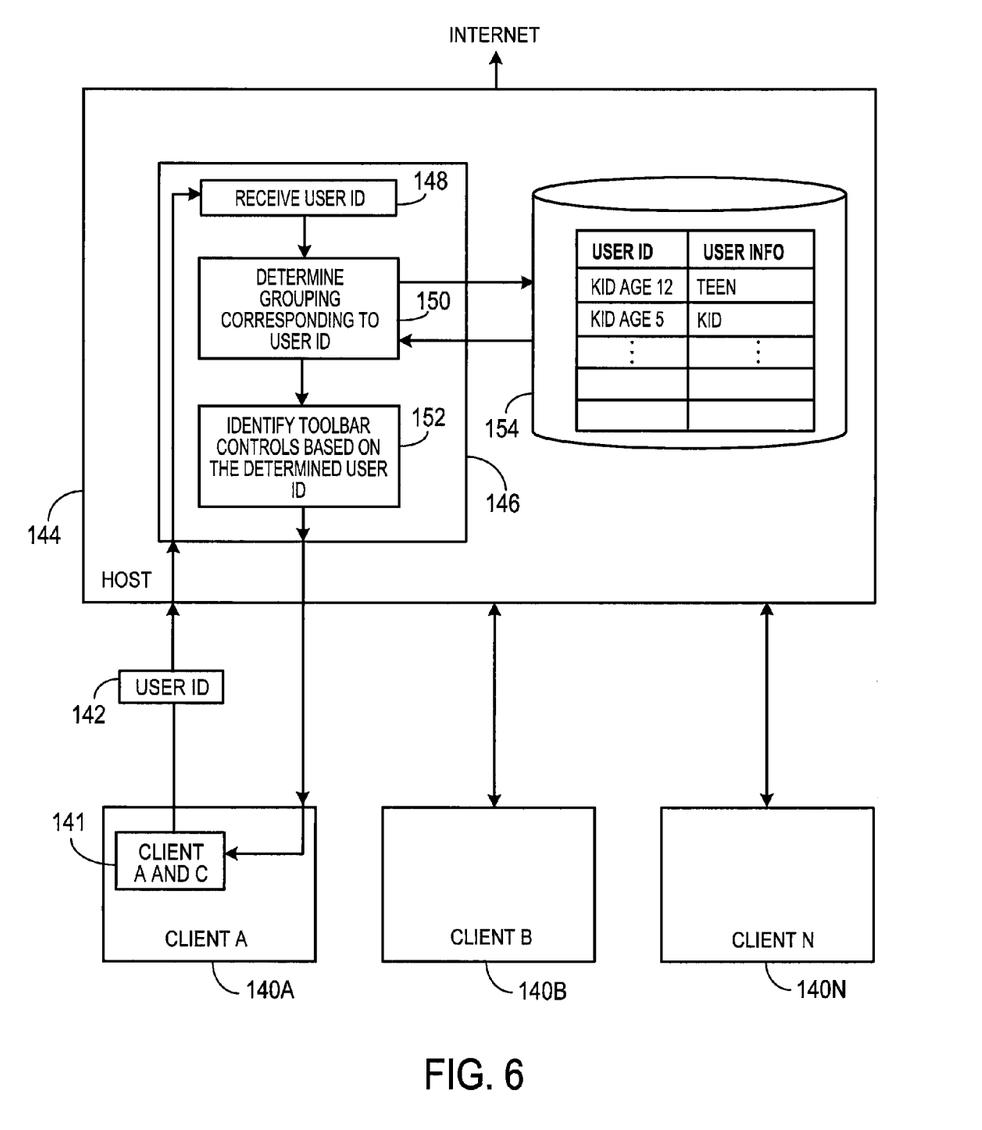
FIG. 6 is a diagram of a system for producing a bank of controls based on an identified access level.

Referring to FIG. 6, in one implementation, a host 144 uses a table 154 to store the grouping assigned to a user identifier (ID). It should be understood that the host 144 may not be a single computer, but a collection of networked computers. A client, such as client 140a, executing client software 141 (e.g., America Online 4.0) initializes a network session by sending a message including a user identifier 142 to the host 144. The message may also include other information such as the client 140a platform (e.g., a PC or Macintosh computer). Software instructions 146 executing on the host 144 use the table 154 to determine the grouping corresponding to the received user ID 142 (150) and identify an associated set of toolbar controls based on the determined access level (152). The host 144 can transmit the toolbar information to the client 140a, which will use the information to display a toolbar having the designated set of toolbar controls.

The host software 146 can prepare toolbar information in a number of ways. For example, the software 146 may begin with a default set of controls (e.g., the controls included in the adult toolbar) and modify the controls included in the toolbar transmitted to the client 140a by eliminating and/or adding controls to the default set. The default set of controls can reside on either the client 140a or host 144.

The software 146 can also modify a control in the default set of controls to produce a different control. For example, the software 146 can produce a different pull-down menu control by removing or adding menu choices from an existing pull-down menu control. Additionally, a new button can be produced by modifying an existing button to have a different picture, descriptive text, and/or preprogrammed function.

The system shown in FIG. 6 is merely illustrative. A wide number of different systems can also produce a toolbar customized for different groupings. For example, user information (e.g., user ID and grouping) can be stored on the client 140a instead of the host 144. This configuration, while potentially faster than the system shown in FIG. 6, may run a risk that a clever youngster may figure out how to alter user information stored at the client and thereby obtain access to network services that may be inappropriate. In contrast, storing toolbar customization information at the host helps prevent against the unauthorized viewing of or access to the customization information. Other implementations, distribute system functions between the host 144 and clients 140a-140n differently. Further, in some implementations, the entire system resides on a single computer instead of a host 144 and client 140a.

Figure 7:
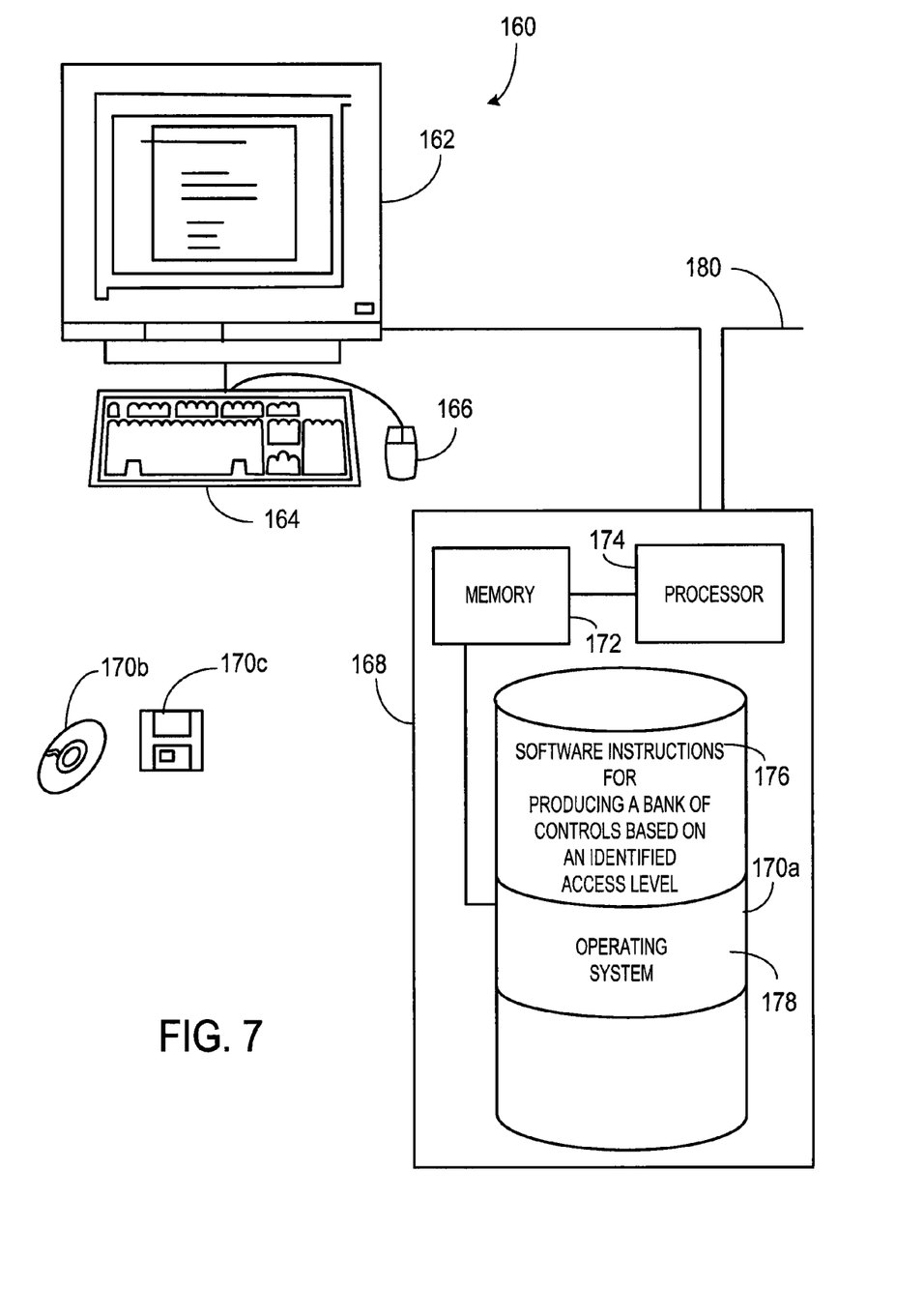
FIG. 7 is a diagram of a computer platform.

Referring to FIG. 7, a computer platform 160 suitable for executing instructions for producing a bank of controls based on an identified access level 176 includes a display 162, a keyboard 164, a pointing device 166 such as a mouse, and a digital computer 168. The digital computer 168 includes memory 172, a processor 174, a mass storage device 170a, and other customary components such as a memory bus and peripheral bus (not shown). The platform 160 may further include a network connection 180.

Mass storage device 170a can store the instructions 176 for producing a bank of controls and instructions for an operating system 178 (e.g., Microsoft Windows 98™). The instructions 176 may be transferred to memory 172 and processor 174 in the course of operation. The instructions cause the display 162 to display images of a graphical user interface. The instructions 176 can be stored on a variety of mass storage devices such as a floppy disk 170b, CD-ROM 170c, or PROM (not shown).

The techniques, methods and systems described here may find applicability in any computing, processing or network environment in which a user interface provides users with access to content or functionality. Various implementations of these systems and techniques may be realized in digital electronic circuitry, or in computer hardware, firmware, software, or in combinations thereof.

A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method of tailoring a user interface for a user, the method comprising:
establishing a master screen name for a master user, the master screen name being associated with an account;
logging the master user into the account under the master screen name;
while the master user is logged into the account under the master screen name, receiving, from the master user:
a first subordinate screen name for a first subordinate user that is subordinate to the master user, the first subordinate screen name being associated with the same account as the master screen name;
instructions to associate the first subordinate screen name with a first demographic grouping from among a list of demographic groupings;
a second subordinate screen name for a second subordinate user that is subordinate to the master user, the second subordinate screen name being associated with the same account as the master screen name and the first subordinate screen name; and
instructions to associate the second subordinate screen name with a second demographic grouping from among the list of demographic groupings;
associating the first subordinate screen name with the first demographic grouping;
associating the second subordinate screen name with the second demographic grouping;
accessing the first demographic grouping associated with the first subordinate screen name;
based on the first demographic grouping associated with the first subordinate screen name, automatically selecting a first menu and a first set of user interface controls, the first set of user interface controls comprising a common control and a second control, and the first menu containing a first plurality of links selectable to access content from remote sources;
accessing the second demographic grouping associated with the second subordinate screen name;
based on the second demographic grouping associated with the second subordinate screen name, automatically selecting a second menu and a second set of user interface controls, the second set of user interface controls including the common control and not including the second control, and the second menu containing a second plurality of links that is different from the first plurality of links and that is selectable to access content from remote sources;

receiving, from the first subordinate user, the first subordinate screen name;

in response to receiving the first subordinate screen name from the first subordinate user, automatically making a first graphical display perceivable to the first subordinate user, the first graphical display including a first toolbar and a control that is user selectable to access the first menu, the first toolbar including the common control and the second control;

receiving, from the second subordinate user, the second subordinate screen name; and in response to receiving the second subordinate screen name from the second subordinate user, automatically making a second graphical display perceivable to the second subordinate user, the second graphical display including a second tool bar and a control that is user selectable to access the second menu, the second toolbar including the common control and not including the second control.

2. The method of claim 1, wherein the first menu comprises a first pull-down menu and the second menu comprises a second pull-down menu that differs from the first pull-down menu.

3. The method of claim 1, wherein the first menu contains one or more links that enable access to first content from a remote source, and the second menu contains one or more links that enable access to second content from a different remote source.

4. The method of claim 3, wherein the remote source comprises a network services provider.

5. The method of claim 1, wherein the demographic groupings comprise maturity level groupings.

6. The method of claim 5, wherein the demographic groupings include a kids grouping and a teenagers grouping.

7. The method of claim 5, wherein the first demographic grouping comprises a child maturity level and the first menu enables access to child appropriate content.

8. The method of claim 7, wherein the second demographic grouping comprises an adult maturity level and the second menu enables access to adult appropriate content.

9. The method of claim 1, wherein automatically making the first menu perceivable comprises making the first menu perceivable without manual selection by the first subordinate user.

10. The method of claim 1, wherein the list of demographic groupings comprises a list of different access levels to services provided by a network service provider account.

11. The method of claim 1, further comprising:

enabling the first subordinate user to manually add links to the first plurality of links or remove links from the first plurality of links in the first menu, wherein subsequent perception of the first menu reveals a menu that includes added links and excludes removed links, and enabling the second subordinate user to manually add links to the second plurality of links or remove links from the second plurality of links in the second menu, wherein subsequent perception of the second menu reveals a menu that includes added links and excludes removed links.

12. The method of claim 1, wherein the master user is a parent or guardian, the first subordinate user is a first child of the parent or guardian, and the second subordinate user is a second child of the parent or guardian.

13. The method of claim 1, wherein the first subordinate screen name comprises a first user identifier that identifies the first subordinate user and the second subordinate screen name comprises a second user identifier that identifies the second subordinate user, the first user identifier being different from the second user identifier.

14. The method of claim 13, wherein accessing the first demographic grouping associated with the first subordinate screen name comprises: using the first user identifier to identify a network service provider subaccount for the first subordinate user under a network service provider account, and identifying the first demographic grouping from information associated with the identified network service provider subaccount.

15. The method of claim 14, wherein the network service provider subaccount for the first subordinate user comprises an account setup by the master user for the first subordinate user to enable the network service provider to provide limitations on access by the first subordinate user to services provided by a network service provider and to provide a customized user interface to the first subordinate user when accessing services provided by the network service provider.

16. The method of claim 13, further comprising:

storing, in a first entry corresponding to the first user identifier in a table, an identifier for the first demographic grouping; and storing, in a second entry corresponding to the second user identifier in the table, an identifier for the second demographic grouping, wherein accessing the first demographic grouping includes accessing, based on the first user identifier, the identifier for the first demographic grouping in the first entry in the table, and wherein accessing the second demographic grouping includes accessing, based on the second user identifier, the identifier for the second demographic grouping in the second entry in the table.

17. The method of claim 1, wherein the first subordinate screen name comprises a name chosen for the first subordinate user that identifies the first subordinate user to other users when the first subordinate user is communicating with the other users online.

18. The method of claim 1, wherein the first demographic grouping is distinct from the second demographic grouping.

19. The method of claim 1, wherein the first toolbar further includes the control for accessing the first menu.

20. The method of claim 19, wherein the control for accessing the first menu comprises a pull-down menu control displayed in the first toolbar.

21. The method of claim 19, wherein the common control, the second control, and the control for accessing the first menu are each either a graphical button or a pull-down menu control displayed in the first toolbar.

22. The method of claim 1, wherein the common control is a graphical button displayed in the first and second toolbars.

23. The method of claim 1, wherein the common control is a pull-down menu control displayed in the first and second toolbars.

24. The method of claim 1, wherein the second control is a graphical button displayed in the first toolbar and not displayed in the second toolbar.

25. The method of claim 1, wherein the second control is a pull-down menu control displayed in the first tool bar and not displayed in the second toolbar.

26. The method of claim 1, wherein the second control comprises the control that is user-selectable to access stock quote information.

27. The method of claim 1, wherein the second control comprises a control that is user-selectable to access weather information.

28. The method of claim 1, wherein the second control comprises a control that is user-selectable to make purchases online.

29. The method of claim 1, wherein:
the first demographic grouping designates the first set of interface controls and designates the first menu related to first content and is configured to enable access to the first content by the first subordinate screen name having the first demographic grouping; and
the second demographic grouping designates the second set of interface controls and designates the second menu related to second content and is configured to enable access to the second content by the second subordinate screen name having the second demographic grouping.

30. A system for tailoring a user interface to a user, the system comprising:
one or more computer processors configured to:
establish a master screen name for a master user, the master screen name being associated with an account;
log the master user into the account under the master screen name; while the master user is logged into the account under the master screen name, receive, from the master user:
a first subordinate screen name for a first subordinate user that is subordinate to the master user, the first subordinate screen name being associated with the same account as the master screen name;
instructions to associate the first subordinate screen name with a first demographic grouping from among a list of demographic groupings; a second subordinate screen name for a second subordinate user that is subordinate to the master user, the second subordinate screen name being associated with the same account as the master screen name and the first subordinate screen name; and
instructions to associate the second subordinate screen name with a second demographic grouping from among the list of demographic groupings;
associate the first subordinate screen name with the first demographic grouping;
associate the second subordinate screen name with the second demographic grouping;
access the first demographic grouping associated with the first subordinate screen name;
based on the first demographic grouping associated with the first subordinate screen name, automatically select a first menu and a first set of user interface controls, the first set of user interface controls comprising a common control and a second control, and the first menu containing a first plurality of links selectable to access content from remote sources;
access the second demographic grouping associated with the second subordinate screen name;
based on the second demographic grouping associated with the second subordinate screen name, automatically select a second menu and a second set of user interface controls, the second set of user interface controls including the common control and not including the second control, and the second menu containing a second plurality of links that is different from the first plurality of links and that is selectable to access content from remote sources;
receive, from the first subordinate user, the first subordinate screen name;
in response to receiving the first subordinate screen name from the first subordinate user, automatically make a first graphical display perceivable to the first subordinate user, the first graphical display including a first toolbar and a control that is user selectable to access the first menu, the first toolbar including the common control and the second control;
receive, from the second subordinate user, the second subordinate screen name; and in response to receiving the second subordinate screen name from the second subordinate user, automatically make a second graphical display perceivable to the second subordinate user, the second graphical display including a second tool bar and a control that is user selectable to access the second menu, the second toolbar including the common control and not including the second control.

31. The system of claim 30, wherein the first demographic grouping is distinct from the second demographic grouping.

32. The system of claim 30, wherein the first toolbar further includes the control for accessing the first menu.

33. The system of claim 32, wherein the control for accessing the first menu comprises a pull-down menu control displayed in the first toolbar.

34. The system of claim 30, wherein the common control, the second control, and the control for accessing the first menu are each either a graphical button or a pull-down menu control displayed in the first toolbar.

35. The system of claim 30, wherein the common control is a graphical button displayed in the first and second toolbars.

36. The system of claim 30, wherein the common control is a pull-down menu control displayed in the first and second toolbars.

37. The system of claim 30, wherein the second control is a graphical button displayed in the first toolbar and not displayed in the second toolbar.

38. The system of claim 30, wherein the second control is a pull-down menu control displayed in the first tool bar and not displayed in the second toolbar.

39. The system of claim 30, wherein the one or more computer processors are further configured to:
enable the first subordinate user to manually add links to the first plurality of links or remove links from the first plurality of links in the first menu, wherein subsequent perception of the first menu reveals a menu that includes added links and excludes removed links, and
enable the second subordinate user to manually add links to the second plurality of links or remove links from the second plurality of links in the second menu, wherein subsequent perception of the second menu reveals a menu that includes added links and excludes removed links.

40. The system of claim 30, wherein:
the first demographic grouping designates the first set of interface controls and designates the first menu related to first content and is configured to enable access to the first content by the first subordinate screen name having the first demographic grouping; and
the second demographic grouping designates the second set of interface controls and designates the second menu related to second content and is configured to enable access to the second content by the second subordinate screen name having the second demographic grouping.

41. A system for tailoring a user interface to a user, the system comprising:

means for establishing a master screen name for a master user, the master screen name being associated with an account;

means for logging the master user into the account under the master screen name;

means for, while the master user is logged into the account under the master screen name, receiving, from the master user:

a first subordinate screen name for a first subordinate user that is subordinate to the master user, the first subordinate screen name being associated with the same account as the master screen name;

instructions to associate the first subordinate screen name with a first demographic grouping from among a list of demographic groupings;

a second subordinate screen name for a second subordinate user that is subordinate to the master user, the second subordinate screen name being associated with the same account as the master screen name and the first subordinate screen name; and         instructions to associate the second subordinate screen name with a second demographic grouping from among the list of demographic groupings;

means for associating the first subordinate screen name with the first demographic grouping;

means for associating the second subordinate screen name with the second demographic grouping;

means for accessing the first demographic grouping associated with the first subordinate screen name;

means for, based on the first demographic grouping associated with the first subordinate screen name, automatically selecting a first menu and a first set of user interface controls, the first set of user interface controls comprising a common control and a second control, and the first menu containing a first plurality of links selectable to access content from remote sources;

means for accessing the second demographic grouping associated with the second subordinate screen name;

means for, based on the second demographic grouping associated with the second subordinate screen name, automatically selecting a second menu and a second set of user interface controls, the second set of user interface controls including the common control and not including the second control, and the second menu containing a second plurality of links that is different from the first plurality of links and that is selectable to access content from remote sources;

means for receiving, from the first subordinate user, the first subordinate screen name;

means for, in response to receiving the first subordinate screen name from the first subordinate user, automatically making a first graphical display perceivable to the first subordinate user, the first graphical display including a first toolbar and a control that is user selectable to access the first menu, the first toolbar including the common control and the second control;

means for receiving, from the second subordinate user, the second subordinate screen name; and     means for, in response to receiving the second subordinate screen name from the second subordinate user, automatically making a second graphical display perceivable to the second subordinate user, the second graphical display including a second tool bar and a control that is user selectable to access the second menu, the second toolbar including the common control and not including the second control.

42. The method of claim 1, wherein the first menu comprises a first favorites menu and the second menu comprises a second favorites menu.

43. The system of claim 30, wherein the first menu comprises a first favorites menu and the second menu comprises a second favorites menu.

44. The system of claim 41, wherein the first menu comprises a first favorites menu and the second menu comprises a second favorites menu.

\* \* \* \* \*